(12) United States Patent
Connolly

(10) Patent No.: US 8,305,910 B2
(45) Date of Patent: Nov. 6, 2012

(54) METHOD AND APPARATUS FOR CONFIGURING, AND COMPILING CODE FOR, A COMMUNICATIONS TEST SET-UP

(75) Inventor: David Connolly, Spokane, WA (US)

(73) Assignee: Agilent Technologies, Inc., Santa Clara, CA (US)

( * ) Notice: Subject to any disclaimer, the term of this patent is extended or adjusted under 35 U.S.C. 154(b) by 1284 days.

(21) Appl. No.: 12/038,645

(22) Filed: Feb. 27, 2008

(65) Prior Publication Data

US 2009/0217251 A1    Aug. 27, 2009

(51) Int. Cl.
*H04J 1/16* (2006.01)
*G06F 15/16* (2006.01)

(52) U.S. Cl. ........................................ 370/250; 709/250

(58) Field of Classification Search .................. 717/140; 719/124

See application file for complete search history.

(56) References Cited

U.S. PATENT DOCUMENTS

| | | | |
|---|---|---|---|
| 2004/0143819 A1* | 7/2004 | Cheng et al. | 717/125 |
| 2008/0172652 A1* | 7/2008 | Davia et al. | 717/124 |
| 2008/0222609 A1* | 9/2008 | Barry et al. | 717/124 |
| 2010/0138562 A1* | 6/2010 | Gorodetsky et al. | 709/250 |

* cited by examiner

*Primary Examiner* — Isaac Tecklu
*Assistant Examiner* — Mohammad Kabir

(57) ABSTRACT

Computer-readable code stored on computer-readable media includes code to allocate at least one data structure in computer memory. The at least one data structure has a plurality of message parameter fields, and each of the message parameter fields has a deterministic position within the at least one data structure. The computer-readable code also includes code to navigate to different ones of the message parameter fields by interpreting non-compiled instructions. The instructions have a form that specifies a position of a particular message parameter field within the at least one data structure, and a number of bits in the particular message parameter field. The position of the particular message parameter field is specified in terms of a number of data offsets in the at least one data structure. The computer-readable code also includes code to configure a communications test-set following navigation to at least one of the message parameter fields.

20 Claims, 8 Drawing Sheets

METHOD AND APPARATUS FOR CONFIGURING, AND COMPILING CODE FOR, A COMMUNICATIONS TEST SET-UP

BACKGROUND

One of the purposes of a communications test-set is to emulate a communications network. The emulation includes the sending and receiving of messages over the network to a device under test. For example, a wireless test-set may emulate a wireless network and send and receive "over-the-air" signaling messages to/from a wireless device via a radio frequency (RF) interface of the test-set.

A communications test-set typically provides a user interface (UI) that enables direct or indirect control over some of the parameters of the messages used by the test-set. Typically, each parameter that is accessible via the UI is individually designed and implemented within the software of the test-set, resulting in practical limitations on the number of parameters that can be made accessible via the UI. Parameters that are not accessible via the UI must be excluded from the messages of the test-set (e.g., if the parameters are optional) or set to fixed values.

It is inevitable that a user of a test-set will want or require access to parameters that have not been made accessible via a test-set's UI.

BRIEF DESCRIPTION OF THE DRAWINGS

Illustrative embodiments of the invention are illustrated in the drawings, in which.

Figure 1:
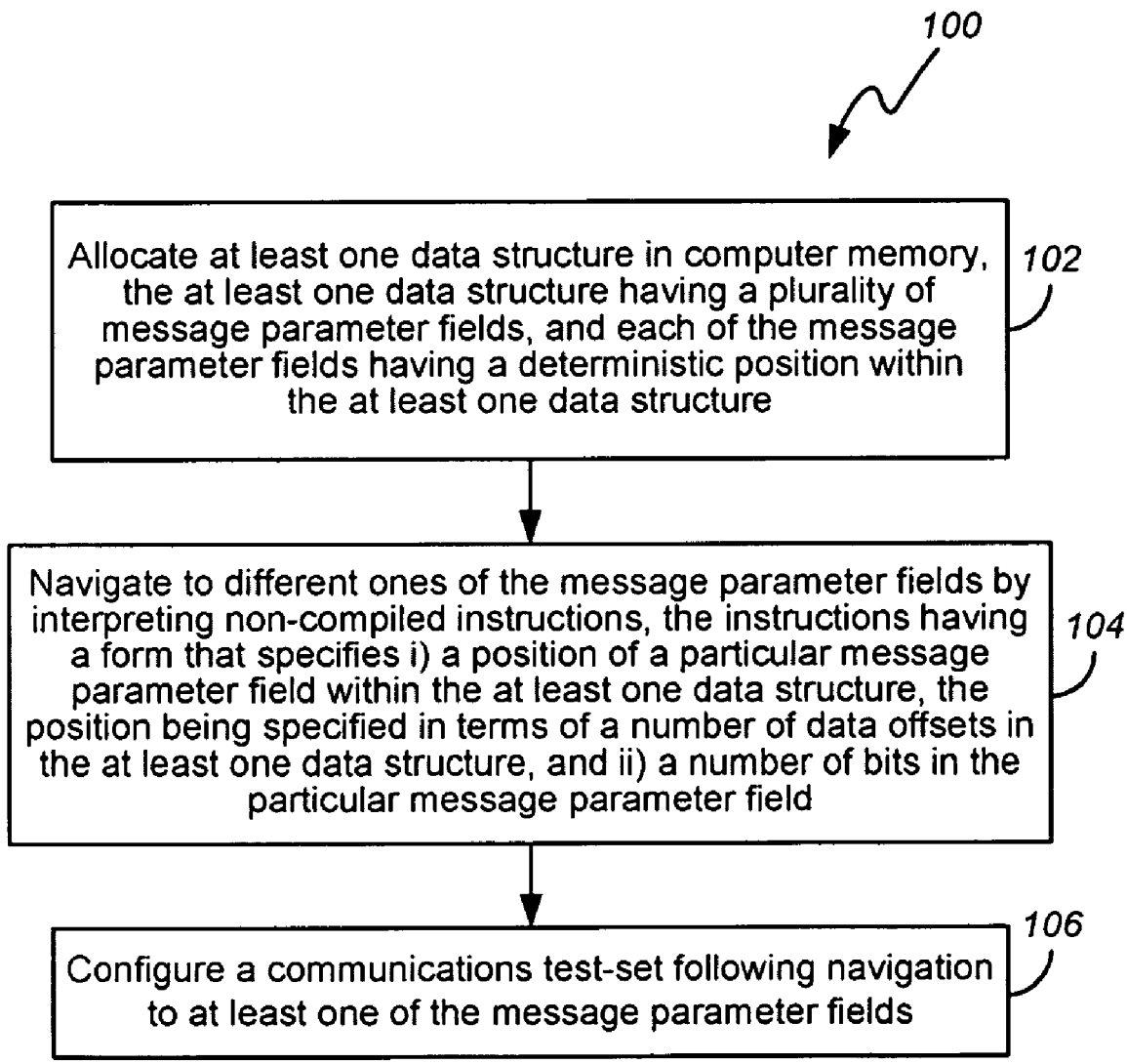
FIG. 1 illustrates a first exemplary method for configuring a communications test-set.

It is noted that, in the following description, like reference numbers appearing in different drawing figures refer to like elements/features. Often, therefore, like elements/features that appear in different drawing figures will not be described in detail with respect to each of the drawing figures.

DETAILED DESCRIPTION

The methods and apparatus disclosed herein pertain to the configuration of, and compilation of code for, a communications test-set. As used herein, a "communications test-set" (or test-set) is a device that is capable of emulating some or all of the aspects of a communications network by sending or receiving messages to/from a device under test (DUT). By way of example, a test-set may be implemented via one or more devices or components, and in some cases may be implemented: as a hand-held device, as a bench-top or rack-mounted component, partly or wholly via a personal computer, or via a distributed system of components. A test-set may also be implemented via one or more of: hardware, software or firmware. In some embodiments, a communications test-set may be a wireless communications test-set, such as a test-set for testing a cellular phone or wireless data card.

As used herein, a "communications network" is a network over which communications are transmitted. The communications network may be a land-based network, such as a copper, fiber or optic-based network, or a wireless network, such as a radio frequency (RF) network. By way of example, the "communications" that are transmitted over the network may be carried via electrical, RF or optical signals.

When communicating with a DUT (i.e., when sending or receiving messages to/from a DUT), a test-set typically generates or interprets a plurality of messages. In some cases, a test-set does this by populating a number of fields in one or more data structures, where each field represents a parameter in a sent or received message. Typically, each of the fields comprises a fixed number of bits in memory (i.e., a fixed length in memory), with the fixed number of bits being equal to or greater than a number of bits that are used to code the parameter in an actual message. For example, a parameter may be coded as 12 bits in a message, but be allotted a 16 or 32-bit field within one of the data structure(s). In this manner, the fields of the data structure(s) have deterministic positions within the data structure(s), and parameters can be populated into or read from the data structure(s) without having to make allowances for variable length or optional parameters.

In the case of message generation, the deterministic data structure(s) mentioned in the preceding paragraph may in some cases be processed to code the parameters contained therein in a message stored in a contiguous block of data (or memory). Conversely, and in the case of message reception, the deterministic data structure(s) mentioned in the preceding paragraph may in some cases be formed by decoding a contiguous block of data received from a DUT.

Having set the above context, FIG. 1 illustrates a first exemplary method 100 for configuring a communications test-set. The method 100 commences with the allocation of at least one data structure in computer memory (at block 102). The allocated data structure(s) have a plurality of message parameter fields, and each of the message parameter fields has a deterministic position within the at least one data structure. In some embodiments, the data structure(s) may be C structures (i.e., data structures conforming to the C programming language or derivates thereof, such as C++).

After allocating the at least one data structure, different ones of the message parameter fields are navigated to by interpreting non-compiled instructions (at block 104). Each of the non-compiled instructions has a form that specifies at least i) a position of a particular message parameter field within the at least one data structure, and ii) a number of bits in the particular message parameter field. The position of the particular message parameter field may be specified in terms of a number of data offsets in the at least one data structure.

Following navigation to at least one of the message parameter fields, the communications test-set is configured (at block 106). By way of example, the test-set may be configured by causing the test-set to i) generate at least one message for transmission to a DUT, ii) generate at least one message for internal use by the test-set, or iii) generate at least one notification based on a parameter of a received message having a particular value.

The method 100 is useful, in one respect, because it can enable navigation to any parameter in a message, as well as the setting or getting of any parameter in a message. This is unlike past methods for configuring a test-set, where the setting and getting of message parameters was architected into a test-set's compiled code, and where the ability to set or get an additional message parameter required modification and re-compilation of the test-set's code. The method 100 is also useful in that the form of the non-compiled instructions can be generic, or at least largely so. That is, although different instructions may be necessary to "get" or "set" a message parameter, the elements of each instruction can be the same.

The data structure(s) allocated by the method 100 may be used for a variety of purposes (and for multiple purposes). In some cases, the data structure(s) may be used to store parameters that serve as the basis for creating one or more messages. The created messages may include, for example, messages that are sent to a DUT. The messages may also include messages that are used internally within a test-set. In other cases, the data structure(s) may be used to store parameters of messages that are received by the test-set. The data structure(s) may also be used to store parameters that will be compared to parameters found in other messages.

The data structure(s) allocated by the method 100 may take various forms. For example, some data structures may include all of the fields and parameters that are necessary to specify one or more messages that are sent or received by a test-set. Other data structures may include only some of the fields and parameters that are necessary to specify a message. These latter data structures may point to or contain linked or nested data structures that include one or more additional fields and parameters of a message.

Figure 2:
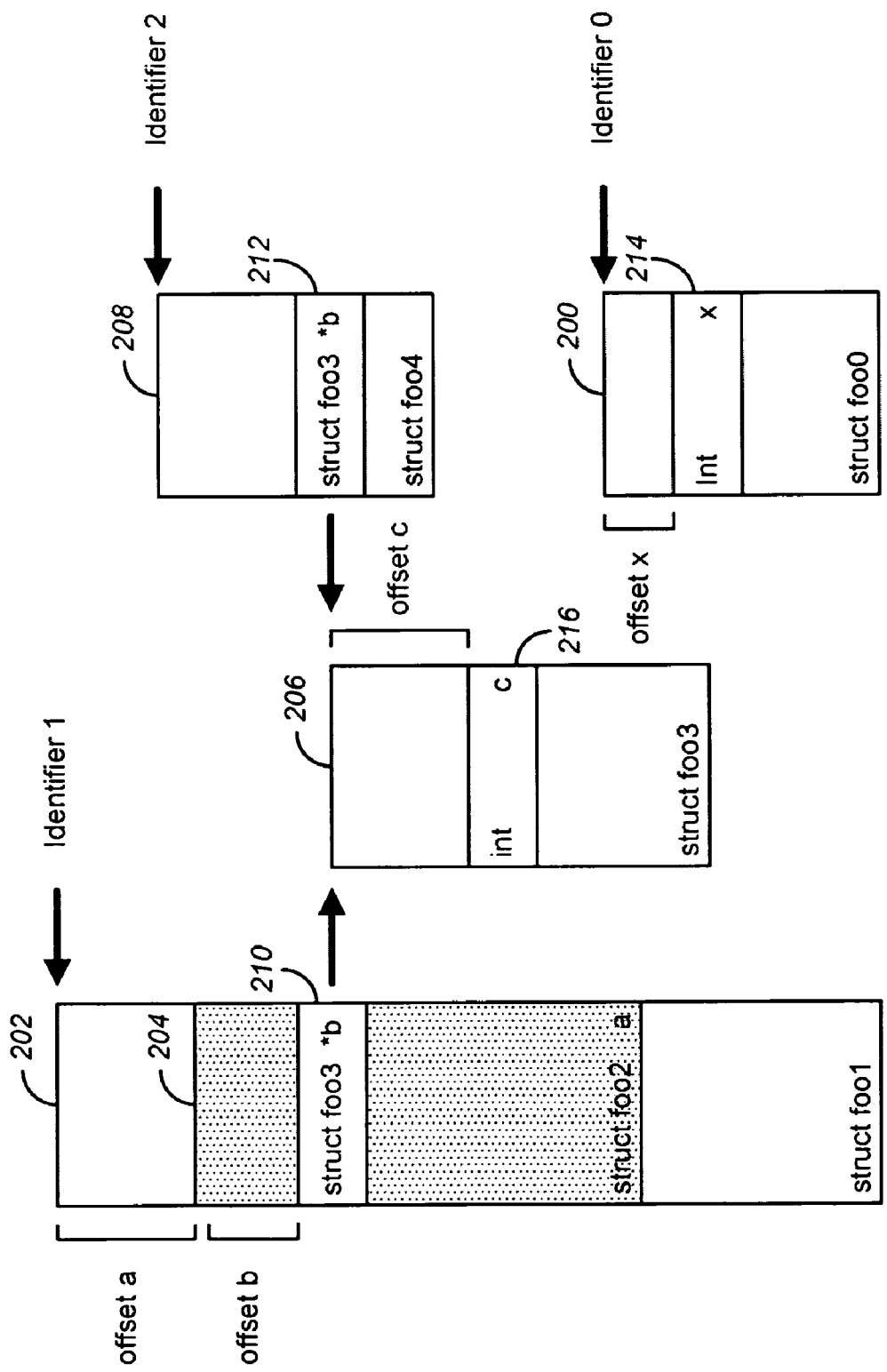
FIG. 2 illustrates an exemplary set of data structures that may be allocated by the method shown in FIG. 1.

By way of example, FIG. 2 illustrates an exemplary set of data structures 200, 202, 204, 206, 208. The data structure 200 ("struct foo0") contains all of the message parameter fields that are necessary to define a first set of one or more messages. The data structure 202 ("struct foo1") has the data structure 204 ("struct foo2") nested therein, and the data structure 204 contains a link (or pointer) 210 to the data structure 206 ("struct foo3"). Together, the data structures 202, 204 and 206 contain all of the message parameter fields that are necessary to define a second set of one or more messages. Finally, the data structure 208 ("struct foo4") contains a pointer 212 to the data structure 206. Together, the data structures 208 and 206 contain all of the message parameter fields that are necessary to define a third set of one or more messages.

If a test-set relies on a single data structure, or if all of a test-set's data structures are related by a single top-level data structure, the method 100 may navigate to different ones of the message parameter fields in the data structure(s) using instructions that specify only i) a position of a particular message parameter field within the data structure(s) (with the position of the particular message parameter field being specified in terms of a number of data offsets), and ii) a number of bits in the particular message parameter field. For example, if a test-set relies solely on the data structure 200 (FIG. 2), a single offset (offset x) could be used to specify a position of a particular message parameter field 214 within the data structure 200. A number of bits (or length) could then specify how many bits (or bytes) are included in the particular message parameter field 214. Alternately, consider a test-set that relies solely on the data structures 202, 204 and 206. For this test-set, the position of a particular message parameter field, such as the field 216, could be specified as the following series of offsets: offset a, offset b, offset c (where "offset a" specifies an offset to a starting address of the data structure 204, where "offset b" specifies an offset to the pointer 210 within the data structure 204, and where "offset c" specifies an offset to the particular message parameter field 216 contained within the data structure 206). Each "offset" within a data structure is preferably referenced to a starting address or function of the data structure.

To accommodate test-sets that rely on more than one top-level data structure, such as the set of top-level data structures 200, 202, 208 shown in FIG. 2, the form of the instructions used to navigate the data structures 200, 202, 208 may further specify an identifier of a particular one of the data structures (e.g., "Identifier 0", "Identifier 1" or "Identifier 2"). In some embodiments, this identifier may be an identifier of a top-level data structure, and one or more offsets may then be used to specify the position of a particular message parameter field within either i) the top-level data structure, or ii) a data structure that is nested within or pointed to by the top-level data structure (or a data structure depending therefrom). In some cases, the "identifier" of the top-level data structure may be a pointer to an automatically generated function associated with the structure in question, and so is guaranteed to be unique.

In accord with the method 100, and as previously mentioned, a test-set may be configured in a variety of ways. However, after navigating to a message parameter field, but before or during configuration of the test-set, a variety of actions may be taken to facilitate test-set configuration. For example, in some embodiments, the form of one or more of the non-compiled instructions may specify a value that is to be written into a particular message parameter field. In these embodiments, the method 100 may include writing these values into corresponding ones of the navigated to message parameter fields, and the step of configuring a test-set may comprise, for example, i) generating at least one message for transmission to a DUT, or ii) generating at least one message for internal use by the test-set.

In some cases, the "value" specified by an instruction may be explicitly specified, such as, by specifying a particular number or string. In other cases, an instruction may specify a value by providing a reference, such as a name or pointer, to a value stored externally from the instruction. In still other cases, an instruction may specify a value by means of an additional instruction, such as an instruction to generate a random value of N bits.

In the above or different embodiments, the method 100 may also comprise the steps of i) retrieving values stored in at least some of the navigated to message parameter fields, and ii) comparing the retrieved values to user-identified values. The step of configuring the test-set may then comprise, for example, i) generating at least one message for transmission to a DUT (or for internal use by the test-set), or ii) generating at least one notification when one of the retrieved values has a particular relationship with (e.g., greater than, less than or within a range of) one of the user-identified values.

Preferably, the writing of values to a data stricture, or the retrieval or monitoring of values in a data structure, is achieved via one or more instruction types having the generic form:

instruction: identifier, position, length, value;

where "instruction" specifies an operation to be performed, where "identifier" identifies a top-level data structure, "position" specifies a number of offsets into one or more data structures, where "length" specifies a number of bits to be accessed, and where "value" specifies a value to be written or compared.

When writing values into (or "populating") the message parameter fields of the data structure(s) allocated by the method 100, it is possible to populate all of the message parameter fields by interpreting non-compiled instructions. However, in many cases, it will still be useful to provide a mechanism for populating one or more (or even most) message parameter fields via compiled instructions. For example, compiled instructions can be useful when populating some or all message parameter fields with default values, so that a user is not required to specify a value for each and every message parameter field. Compiled instructions can also provide an architected mechanism for enabling a user to easily access message parameters that are commonly configured or monitored.

Figure 3:
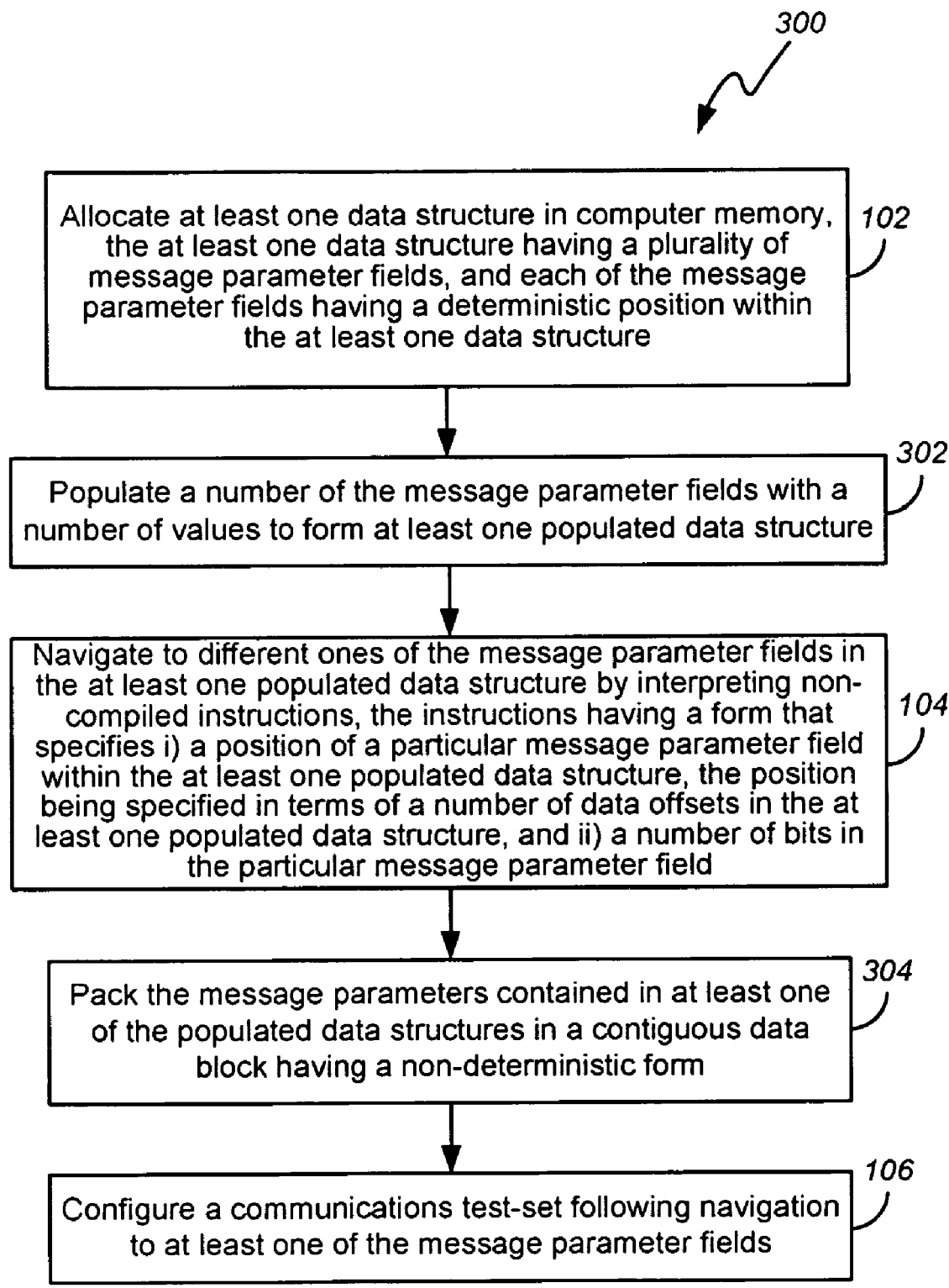
FIG. 3 illustrates a second exemplary method for configuring a communications test-set.

In some embodiments, the method 100 may further comprise "packing" the message parameters contained in at least one of the data structures in a contiguous data block, prior to configuring the communications test-set. This is shown in step 304 of method 300 (which method 300, shown in FIG. 3, is a variant of method 100, shown in FIG. 1). In some cases, the contiguous data block may have a non-deterministic or self-referential form. That is, when message parameters are packed in the contiguous data block, optional but unspecified parameters in one of the deterministic data structures may not be represented in the contiguous data block. Also, parameters having a variable length, which parameters are stored in fixed-length fields of one or more of the deterministic data structures, may be represented by varying numbers of bits in the contiguous data block. Thus, it will often be impossible to navigate to a particular message parameter in the contiguous data block without knowing the details (e.g., presence, length) of one or more other parameters that are contained (or not contained) in the contiguous data block.

After packing a plurality of message parameters in a contiguous data block, additional data mall be inserted in the contiguous data block. In some cases, data may be inserted as an additional message payload, or as random data that is used to test a DUT's response to random data. As used herein, "inserted" data includes data that is inserted between two data bits in the contiguous data block, as well as data that is inserted before or after (i.e., appended to) the initial or final data bit of the contiguous data block. In some embodiments, the data may be inserted by interpreting non-compiled instructions that cause a test-set to navigate to a position in the contiguous data block and insert the data at the navigated to position. In this regard, the form of the non-compiled instructions may specify i) a position in terms of a data offset in the contiguous data block, and ii) the data to be inserted. The form of the non-compiled instructions may also specify an identifier of the contiguous data block, such as a starting address of the contiguous data block. The "data to be inserted" may be specified in various ways, such as: explicitly, by reference to data stored externally from the instruction, or by means of an instruction for generating the data (e.g., an instruction for generating random data).

As also shown in FIG. 3, and in some embodiments, the method 300 may comprise populating a number of message parameter fields with a number of message parameters, prior to navigating to different ones of the message parameter fields by interpreting non-compiled instructions, to form at least one populated data structure (at block 302). Then, after navigating to a number of message parameter fields in the populated data structure(s) (and possibly setting ones the message parameters as indicated by a number of non-compiled instructions), the populated data structure(s) are packed into a contiguous data block (at block 304).

Figure 4:
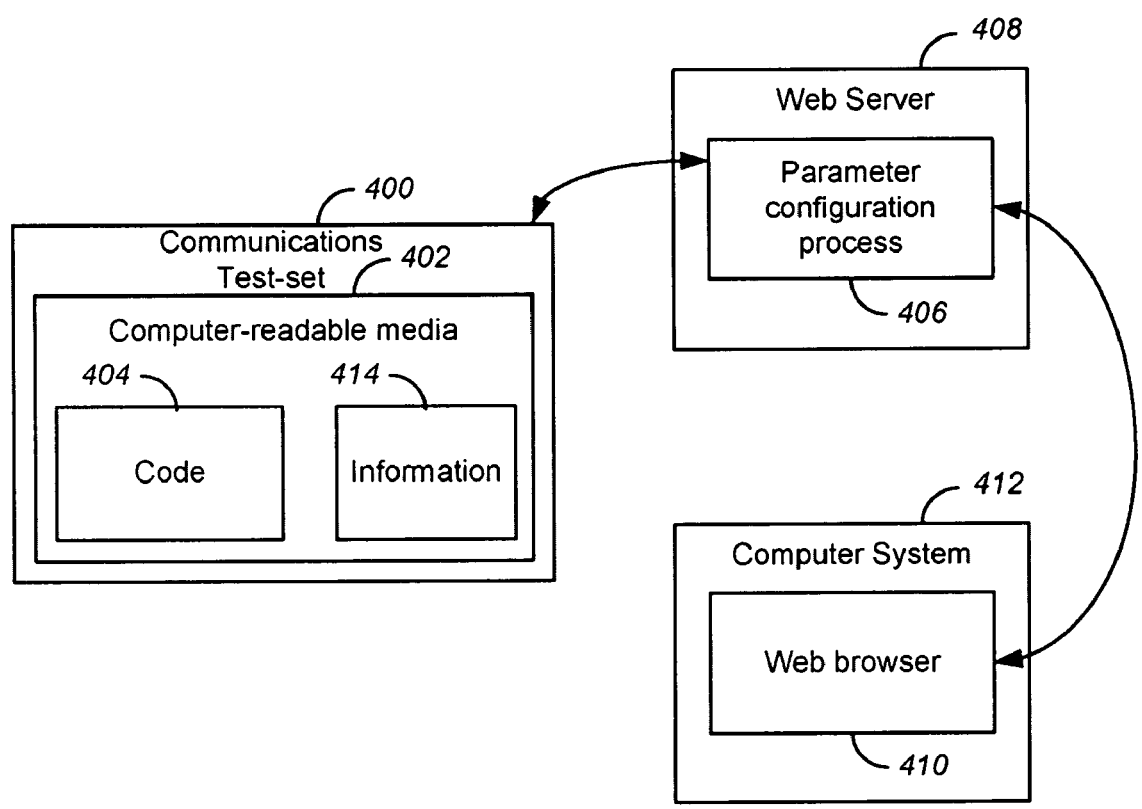
FIG. 4 illustrates an exemplary communications test-set, web server and computer system for implementing the method shown in FIG. 1 or 3, or other methods.

FIG. 4 illustrates an exemplary test-set 400 that may be configured via the method 100 or method 300. Typically, the method 100 or 300 will be implemented by means of computer-readable code 404 stored on computer-readable media 402. The computer-readable media 402 may be contained within the test-set (as shown), coupled to the test-set, or provided by means of another device or computer system that is coupled to the test-set. The computer-readable media 402 may include, for example, any number or mixture of fixed or removable media (such as one or more fixed disks, random access memories (RAMs), read-only memories (ROMs), or compact discs). The computer-readable code 404 will typically comprise software or firmware, but could also comprise instructions coded in a programmed circuit.

In some embodiments, the non-compiled instructions that are interpreted by the method 100 or 300 may be manually created and edited. However, it will often be useful to have the instructions generated via a parameter configuration process. In this regard, FIG. 4 illustrates an exemplary parameter configuration process 406 that, by way of example, is shown to be stored on a web server 408. In some embodiments, the parameter configuration process 406 may be accessed via a web browser 410 or other graphical user interface (GUI) displayed on a computer system 412. Optionally, the computer system 412 may be integrated with the test-set 400.

In some embodiments, the parameter configuration process 406 automatically generates the non-compiled instructions that are interpreted by the test-set. To do this, the parameter configuration process 406 may rely on information 414 that describes the form and content of the data structure(s) used by the test-set 400. This information 414 may be maintained in various places, including, for example, in the test-set 400 or at the web server 408. However, it typically makes sense to store the information 414 in the test-set 400, as shown in FIG. 4. In some embodiments, the information 414 may include, for each of various message parameter fields in the data structure(s) used by the test-set 400, i) the position of the particular message parameter field within at least one data structure, the position being specified in terms of a number of data offsets in the at least one data structure, ii) a number of bits in the particular message parameter field, and iii) a name of a message parameter stored in the particular message parameter field. The information 414 may also include other items. For example, if the test-set 400 utilizes multiple data structure(s), the information 414 may include identifiers (e.g., references to functions) of the top-level data structures in which particular message parameter fields are located.

In some embodiments, the information 414 may be stored in computer-readable media 402 for retrieval by the parameter configuration process 406, and the information 414 may be retrieved via a hardware or firmware interface of the test-set 400, with little or no assistance by the software or firmware (e.g., code 404) of the test-set 400. In other embodiments, the software or firmware of the test-set 400 may receive and respond to requests for the information 414, which requests may be initiated by the parameter configuration process 406 or other processes.

As will be discussed later in this description, some of the information 414 may be generated and saved during compile of the code 404. Other portions of the information 414 may be generated upon execution of the code 404, or following a query from the parameter configuration process 406. For example, the identifiers of top-level data structures in memory, such as the actual memory addresses of unique functions that identify the top-level data structures, may not be available until the code 404 executes. This sort of information may be generated and stored at run-time, along with other pieces of the information 414; or, it may be dynamically discovered and returned in response to one or more queries received from the parameter configuration process 406.

In some cases, the parameter configuration process 406 may cause a user to be prompted for message parameter values, and these values may then be relayed to the test-set

400. The test-set 400 may then generate any necessary instructions based on the values it receives. In other cases, the parameter configuration process 406 may both i) receive message parameter values from a user, and ii) generate the instructions that are needed to use these values. In these latter cases, the test-set 400 merely receives and processes the instructions.

Figure 5:
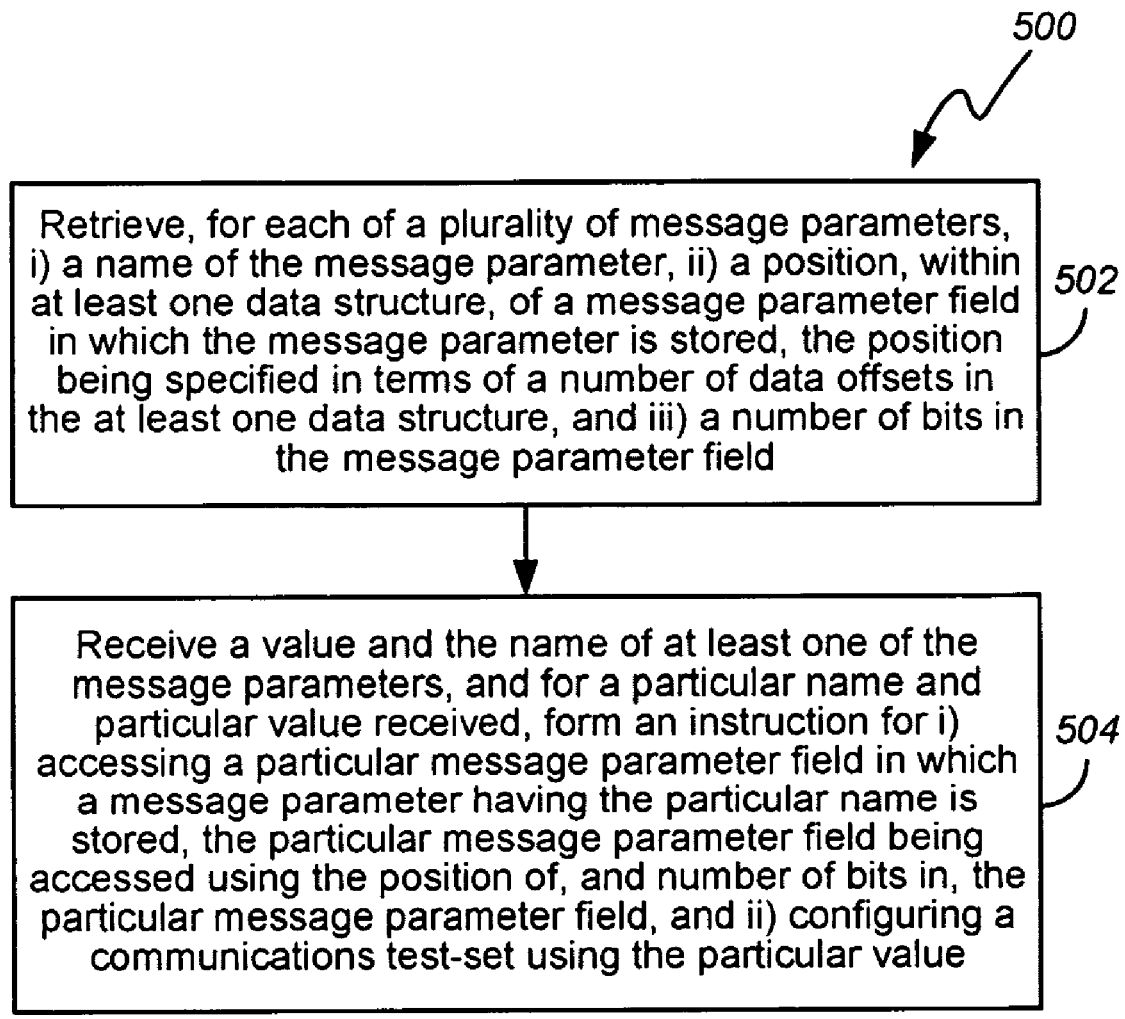
FIG. 5 illustrates a third exemplary method for configuring a communications test-set.

FIG. 5 illustrates a second exemplary method 500 for configuring a communications test-set. In some cases, the method 500 may be implemented via computer-readable code stored on computer-readable media, such as, by the parameter configuration process 406 stored on the web server 408 (see FIG. 4). The method 500 comprises a step of retrieving, for each of a plurality of message parameters, i) a name of the message parameter, ii) a position, within at least one data structure, of a message parameter field in which the message parameter is stored, the position being specified in terms of a number of data offsets in the at least one data structure, and iii) a number of bits in the message parameter field (at block 502). In some cases, the retrieved information may further comprise, for each of the message parameters, an identifier of a particular one of the data structure(s) in which the message parameter is stored (e.g., an identifier of a top-level data structure). By way of example, the information retrieved in this step may be retrieved from the information 414 stored in the test-set 400 (FIG. 4).

The method 500 also comprises a step of receiving a value and name of at least one of the message parameters. Then, for the name and value received, the method 500 may form an instruction for i) accessing a particular message parameter field in which a message parameter having the particular name is stored (with the particular message parameter field being accessed using the position of, and number of bits in, the particular message parameter field), and ii) configuring a communications test-set using the particular value. See, block 504. If the information retrieved in step 502 includes identifiers of data structures in which message parameters are stored, then each of the instructions formed in step 504 may reference one of these identifiers.

Figure 6:
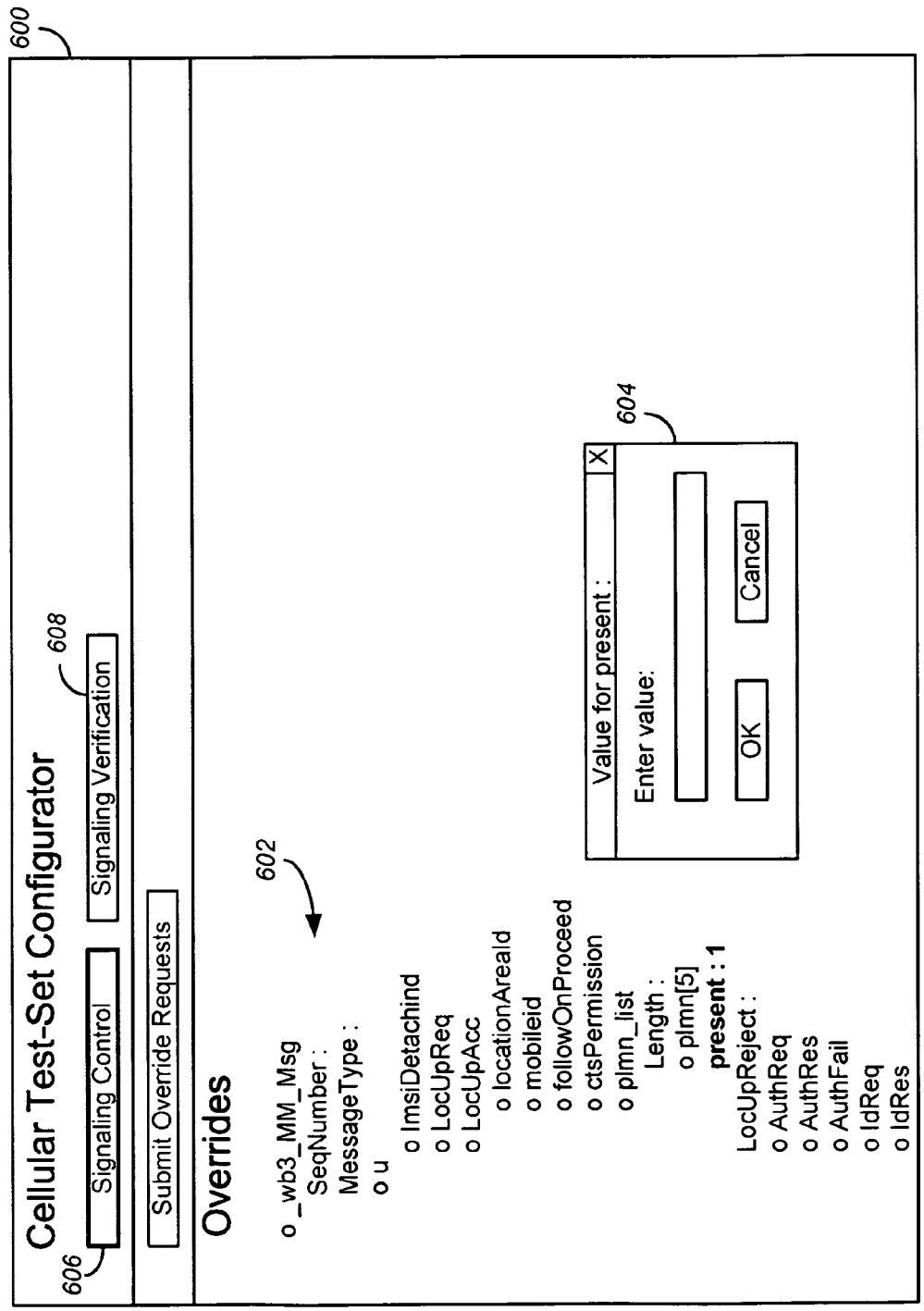
FIG. 6 illustrates a first exemplary web browser window that may be displayed by the computer system shown in FIG. 4 during execution of the method shown in FIG. 5.

In some embodiments, the order of the steps 502, 504 of the method 500 is not important. For example, if a user already knows the name of a message parameter, the user could provide the name and value of the message parameter before, while or after information about the message parameter is being retrieved. However, in most cases, it is believed useful to retrieve information about a set of message parameters first. This information can then be used to display some or all of the names of the message parameters within a graphical user interface (GUI), and mechanisms such as text fields or pop-up windows can be provided for a user to input values of the message parameters into the GUI. In this regard, FIG. 6 illustrates an exemplary web browser window 600 that may be displayed via the computer system 412 (FIG. 4). The window 600 displays the names of message parameters in a hierarchical manner, as determined by the positions of the message parameter fields in which the message parameters are stored within one or more data structures. In one embodiment, the information on which the displays shown in FIG. 6 is based is i) stored by the test-set 400, ii) retrieved by the parameter configuration process 406 of the web server 408 (e.g., via an FTP process), and then iii) used by the parameter configuration process 406 to generate the contents of the web browser window 600 displayed by the computer system 412.

By way of example, the window 600 is titled "Cellular Test-Set Configurator", and the window 600 is used to input message parameter values that override "default" or other parameter values during generation of a message named "wb3_MM_Msg". Any field (parameter) in the structure 602 that has a small "o" to the left of its name may be expanded (e.g., that field may itself be a structure).

The exemplary scenario illustrated in FIG. 6 shows that the field "present" of the structure "plmn_list" has been given a value "1". However, because a user has once again selected the "present" field, a pop-up window 604 has been generated for the purpose of receiving a new value for the "present" field. The "present"0 field indicates to the test-set firmware whether the component "plmn_list" should be included in the message. "plmn_list" is an optional component of the Location Update Accept message (LocUpAcc). In the test-set firmware this field might be hard-coded to "0", but would be overridden upon the user specifying a new value via the windows 600 and 604.

As shown in FIG. 6, a button 606 labeled "Signaling Control" is depressed. Pressing the button 606 configures the window 600 to receive "Overrides". Upon a user's press of the button 608, labeled "Signaling Verification", the window could be reconfigured to receive "Notification Requests" (i.e., user-identified values upon which notifications will be generated).

Figure 7:
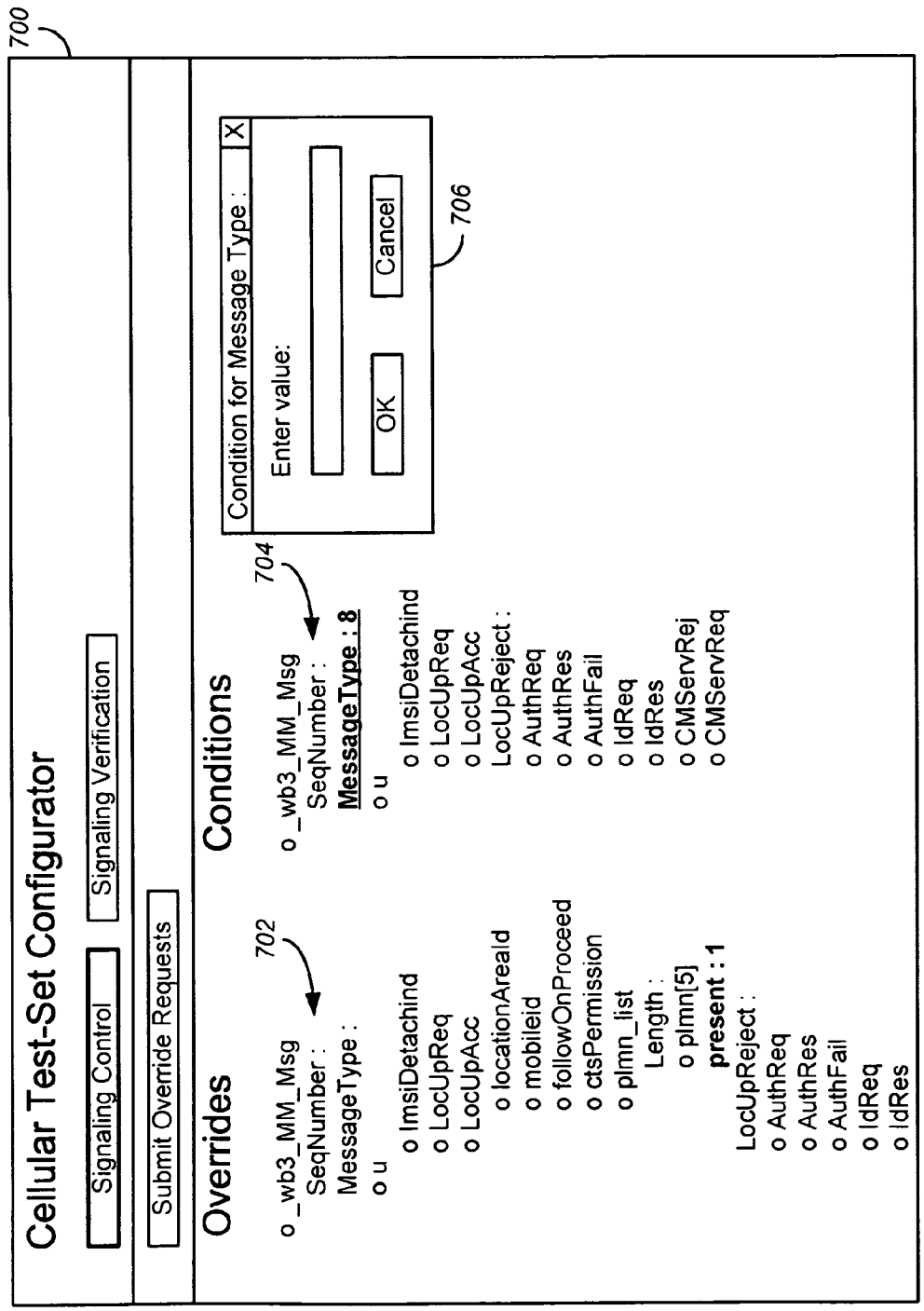
FIG. 7 illustrates a second exemplary web browser window that may be displayed by the computer system shown in FIG. 4 during execution of the method shown FIG. 5.

In some cases, the parameter configuration process 406 (FIG. 4) may use the retrieved information 414 to generate a GUI display 700 (FIG. 7) having first and second structures 702, 704, each of which displays at least some message parameter names. In some cases, the first and second structures 702, 704 may be first and second trees of message parameter names; and in some cases, the first and second structures may be identical structures. The parameter configuration process 406 may then i) provide a mechanism such as the pop-up window 604 (FIG. 6) for a user to specify values of the message parameters in the first structure 702, and ii) provide a mechanism such as the pop-up window 706 for the user to specify, in the second structure 704, conditions under which the values specified in the first structure 702 are to be effective. For example, if the first structure 702 is used to specify a value that is to be written into the "present" field of "plmn_list", the second structure 704 may be used to specify that the value provided for the "present" field is only to be set when certain message parameters, such as "MessageType", have the values provided in the second structure 704. Or, for example, if the first structure 702 is used to specify a value that triggers a notification, the second structure 704 may be used to specify other values (i.e., conditions) that must exist before the notification is generated.

Once the method 500 (FIG. 5) receives the name and value of a message parameter, the method 500 may form the necessary instructions. The instructions may include any of the instructions mentioned in this description, including, instructions that write particular values to particular message parameter fields, and instructions that i) compare a particular user-defined value to a value retrieved from a particular message parameter field, and ii) generate a notification upon the user-defined and retrieved values having a particular relationship. The relationship may be, for example, "less than", "greater than", or "within a range of".

If the method 500 is used to form instructions of different types, then, for a particular name and value received, a particular instruction type may also be received. An instruction having the particular instruction type may then be formed in step 504. In some embodiments, different instruction types may be inferred from the contexts in which the parameter configuration process 406 (FIG. 4) causes message parameter names to be displayed to a user. For example, if message parameter names are displayed within an "Override" context, as shown in FIG. 6, an instruction type that writes a new value into a data structure mats be inferred for any user-provided values. Or, for example, if message parameter names are displayed within a "Monitor" context, an instruction type that monitors a message parameter field for a user-provided value may be inferred.

Figure 8:
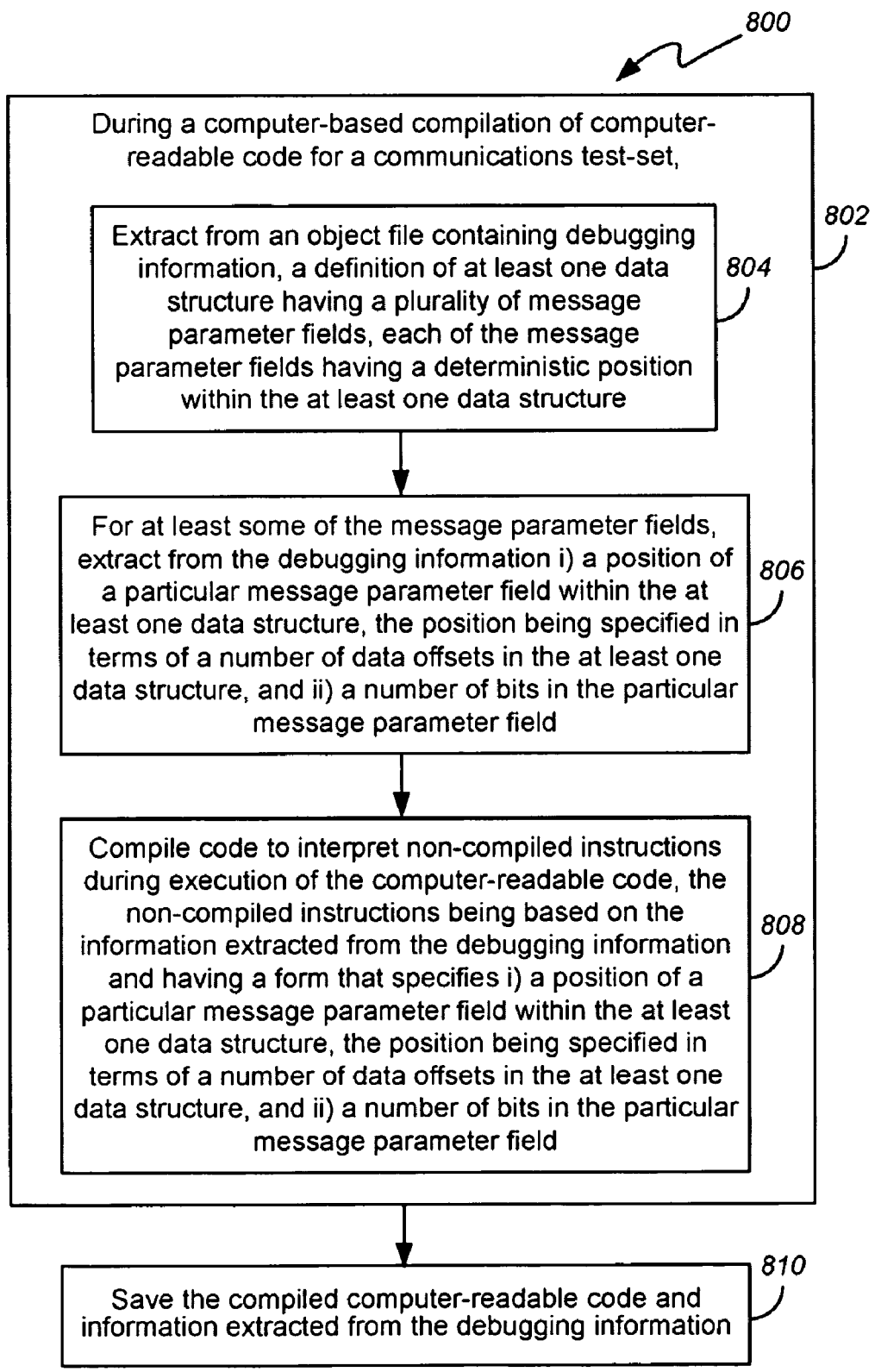
FIG. 8 illustrates an exemplary method for compiling code for a communications test-set.

Having described how message parameters may be set, monitored or otherwise accessed, a description of how the information 414 (FIG. 4) that describes a test-set's data structures is generated will now be provided. In one embodiment, and as shown in FIG. 8, the information 414 may be generated during a computer-based compilation of the computer-readable code 404 (e.g., software or firmware) for the test-set 400. For example, during compilation of the computer-readable code (at block 802), a definition of one or more data structures having a plurality of message parameter fields may be extracted from an object file containing debugging information (at block 804). In some cases, each of the message parameter fields may have a deterministic position within the one or more data structures. For at least some of the message parameter fields, the following information may be extracted from the debugging information: i) a position of a particular message parameter field within the at least one data structure, the position being specified in terms of a number of data offsets in the at least one data structure, ii) a number of bits in the particular message parameter field, and if necessary (e.g., because more than one top-level data structure is extracted from the debugging information), iii) an identifier of a particular one of the at least one data structure. See, block 806.

The compilation of the computer-readable code further comprises the compilation of code to interpret non-compiled instructions during execution of the computer-readable code (at block 808). The non-compiled instructions are based on the information extracted from the debugging information and have a form that specifies i) a position of a particular message parameter field within the at least one data structure, the position being specified in terms of a number of data offsets in the at least one data structure, ii) a number of bits in the particular message parameter field, and if necessary, iii) an identifier of a particular one of the at least one data structure.

The method 800 shown in FIG. 8 concludes with a step of saving the compiled computer-readable code and information extracted from the debugging information (at block 810).

In some embodiments of the method 800, the object file containing the debugging information may be an object file containing debugging symbol information that is coded using the DWARF (Debug With Arbitrary Record Format) standard. The DWARF symbol information contains, among other things, the human-readable names of all data structures and their member fields, along with their location in memory relative to the starting address of a particular data structure. The DWARF symbol information may serve as the basis for the "information" extracted by the method 800, but may be stripped from the extracted definition of the at least one data structure.

What is claimed is:

1. Apparatus, comprising:
computer-readable media; and
computer-readable code, stored on the computer-readable media, including,
code to allocate at least one data structure in computer memory, the at least one data structure having a plurality of message parameter fields, and each of the message parameter fields having a deterministic position within the at least one data structure;
code to navigate to different ones of the message parameter fields by interpreting non-compiled instructions, the instructions having a form that specifies i) a position of a particular message parameter field within the at least one data structure, the position being specified in terms of a number of data offsets in the at least one data structure, and ii) a number of bits in the particular message parameter field; and
code to configure a communications test-set to emulate a communication network following navigation to at least one of the message parameter fields.

2. The apparatus of claim 1, wherein the form of at least one of the instructions specifies a value to write into a particular message parameter field, wherein the computer-readable code further comprises code to write values specified by the non-compiled instructions into corresponding ones of the navigated to message parameter fields, and wherein the code to configure the communications test-set comprises code to generate at least one message for transmission to a device under test.

3. The apparatus of claim 1, further comprising:
code to i) retrieve values stored in at least some of the navigated to message parameter fields, and ii) compare the retrieved values to user-identified values;
wherein the code to configure the communications test-set comprises code to generate at least one message for transmission to a device under test.

4. The apparatus of claim 1, further comprising:
code to i) retrieve values stored in at least some of the navigated to message parameter fields, and ii) compare the retrieved values to user-identified values;
wherein the code to configure the communications test-set comprises code to generate at least one notification upon one of the retrieved values and one of the user-identified values having a particular relationship.

5. The apparatus of claim 1, wherein the form of the instructions further specifies an identifier of a particular one of the at least one data structure.

6. The apparatus of claim 1, wherein the computer-readable code further includes code to pack the message parameters contained in at least one of the data structures in a contiguous data block, prior to configuring the communications test-set.

7. The apparatus of claim 6, wherein the computer-readable code further includes code to populate a number of the message parameter fields with a number of values, prior to navigating to different ones of the message parameter fields by interpreting the non-compiled instructions, to form at least one populated data structure, wherein interpretation of the non-compiled instructions results in navigation to message parameter fields in the at least one populated data structure.

8. The apparatus of claim 6, further comprising code to navigate to a position in the contiguous data block, and to insert data at the navigated to position, by interpreting non-compiled instructions having a form that specifies i) a position in terms of a data offset in the contiguous data block, and ii) the data to be inserted.

9. The apparatus of claim 1, further comprising:
information, stored in the computer-readable media, including, for each of the different ones of the message parameter fields, i) the position of the particular message parameter field within the at least one data structure, the position being specified in terms of a number of data offsets in the at least one data structure, ii) a number of bits in the particular message parameter field, and iii) a name of a message parameter stored in the particular message parameter field;
wherein the computer-readable code further includes, code to provide the information to a parameter configuration process; and code to receive the non-compiled instructions from the parameter configuration process.

10. The apparatus of claim 1, further comprising:

information, stored in the computer-readable media for retrieval by a parameter configuration process, including, for each of the different ones of the message parameter fields, i) the position of the particular message parameter field within the at least one data structure, the position being specified in terms of a number of data offsets in the at least one data structure, ii) a number of bits in the particular message parameter field, and iii) a name of a message parameter stored in the particular message parameter field;

wherein the computer-readable code further includes code to receive the non-compiled instructions from the parameter configuration process.

11. Apparatus for configuring a communications test-set to emulate a communications network, the apparatus comprising:

computer-readable media; and computer-readable code, stored on the computer-readable media, including, code to retrieve, for each of a plurality of message parameters, i) a name of the message parameter, ii) a position, within at least one data structure, of a message parameter field in which the message parameter is stored, the position being specified in terms of a number of data offsets in the at least one data structure, and iii) a number of bits in the message parameter field;

code to receive a value and the name of at least one of the message parameters, and for a particular name and particular value received, form an instruction for i) accessing a particular message parameter field in which a message parameter having the particular name is stored, the particular message parameter field being accessed using the position of, and number of bits in, the particular message parameter field, and ii) configuring a communications test-set using the particular value.

12. The apparatus of claim 11, wherein the computer-readable code further includes code to display at least some of the names of the message parameters within a graphical user interface (GUI), and to provide a mechanism for a user to input values of the message parameters into the GUI.

13. The apparatus of claim 12, wherein the code display at least some of the names of the message parameters within the GUI displays the names of the message parameters in a hierarchical manner, as determined by the positions of the message parameter fields in which the message parameters are stored within the at least one data structure.

14. The apparatus of claim 11, wherein the computer-readable code further includes code to i) display at least some of the names of the message parameters within a graphical user interface (GUI), the names being displayed in first and second structures, ii) provide a mechanism for a user to specify values of the message parameters in the first structure, and iii) provide a mechanism for the user to specify, in the second structure, conditions under which the values specified in the first structure are effective.

15. The apparatus of claim 11, further comprising:

code to retrieve, for each of the plurality of message parameters, an identifier of a particular one of the at least one data structure;

wherein the code to form an instruction for configuring the communications test-set forms an instruction that references the identifier retrieved for the message parameter corresponding to the particular name.

16. The apparatus of claim 11, wherein the code to form an instruction for configuring the communications test-set forms an instruction that writes the particular value to the particular message parameter field.

17. The apparatus of claim 11, wherein the code to form an instruction for configuring the communications test-set forms an instruction that i) compares the particular value to a value retrieved from the particular message parameter field, and ii) generates at least one notification upon the particular value and the retrieved value having a particular relationship.

18. The apparatus of claim 11, wherein the code to form an instruction for configuring the communications test-set further receives, for a particular name and particular value received, a particular instruction type, wherein the code forms an instruction of the particular instruction type.

19. A method, comprising:

during a computer-based compilation of computer-readable code for a communications test-set, extracting from an object file containing debugging information, a definition of at least one data structure having a plurality of message parameter fields, each of the message parameter fields having a deterministic position within the at least one data structure;

for at least some of the message parameter fields, extracting from the debugging information i) a position of a particular message parameter field within the at least one data structure, the position being specified in terms of a number of data offsets in the at least one data structure, and ii) a number of bits in the particular message parameter field;

compiling code to interpret non-compiled instructions during execution of the computer-readable code, the non-compiled instructions being based on the information extracted from the debugging information and having a form that specifies i) a position of a particular message parameter field within the at least one data structure, the position being specified in terms of a number of data offsets in the at least one data structure, and ii) a number of bits in the particular message parameter field; and saving the compiled computer-readable code and information extracted from the debugging information.

20. The method of claim 19, wherein the form of the non-compiled instructions further specifies an identifier of a particular one of the at least one data structure.

* * * * *